United States Patent [19]

Bradley

[11] 4,099,489

[45] Jul. 11, 1978

[54] FUEL REGENERATED NON-POLLUTING INTERNAL COMBUSTION ENGINE

[76] Inventor: Curtis E. Bradley, 4517 Calle Ventura, Phoenix, Ariz. 85018

[21] Appl. No.: 744,193

[22] Filed: Nov. 22, 1976

Related U.S. Application Data

[60] Continuation-in-part of Ser. No. 620,021, Oct. 6, 1975, Pat. No. 4,003,204, Ser. No. 620,022, Oct. 6, 1975, Pat. No. 4,003,344, and Ser. No. 620,023, Oct. 6, 1975, Pat. No. 4,003,345, each is a division of Ser. No. 456,974, Aug. 1, 1974, Pat. No. 3,939,806.

[51] Int. Cl.² .............. F02B 43/08; F01K 23/10
[52] U.S. Cl. ........................... 123/3; 123/119 E; 123/DIG. 12; 60/618
[58] Field of Search .............. 123/1 A, 3, 41.2, 41.21, 123/119 E, 121, DIG. 12; 60/39.18 B, 616, 618

[56] References Cited

U.S. PATENT DOCUMENTS

| | | | |
|---|---|---|---|
| 1,966,345 | 7/1934 | Harrell | 123/121 |
| 2,509,498 | 9/1950 | Heyl | 123/DIG. 12 |
| 2,633,707 | 4/1953 | Hermitte et al. | 60/39.18 B |
| 3,311,097 | 3/1967 | Mittelstaedt | 123/DIG. 12 |
| 3,362,883 | 1/1968 | Wright | 123/DIG. 12 |
| 3,459,953 | 8/1969 | Hughes et al. | 123/DIG. 12 |
| 3,653,364 | 4/1972 | Bogan | 123/3 |
| 3,696,795 | 10/1972 | Smith | 123/119 E |
| 3,704,587 | 12/1972 | Krieb et al. | 60/39.18 B |
| 3,792,690 | 2/1974 | Cooper | 123/3 |

Primary Examiner—Charles J. Myhre
Assistant Examiner—David D. Reynolds

[57] ABSTRACT

An internal combustion engine in which heat is derived from the engine cooling system and the exhaust to heat a working fluid and to transform it into a gas which drives a turbine which operates a generator. Direct current from the latter is delivered to an electrolysis cell containing purified water which is decomposed into hydrogen and oxygen. The oxygen is injected under pressure into the combustion chambers of the engine while the hydrogen is also injected under pressure into a carburetor where it is combined with conventional hydrocarbon fuel.

11 Claims, 6 Drawing Figures

4,099,489

FUEL REGENERATED NON-POLLUTING INTERNAL COMBUSTION ENGINE

This application is a continuation-in-part of the co-pending applications of Curtis E. Bradley, Ser. Nos. 620,021 now U.S. Pat. No. 4,003,204, 620,022 now U.S. Pat. No. 4,003,344 and 620,023 now U.S. Pat. No. 4,003,345, all filed Oct. 6, 1975 and entitled: FUEL REGENERATED and NON-POLLUTING COMBUSTION ENGINE, and which applications are divisions of the application of the said Curtis E. Bradley, Ser. No. 456,974 filed Aug. 1, 1974 and issued as U.S. Pat. No. 3,939,806.

The present invention relates to internal combustion engines and is concerned primarily with the generation of power derived from engine heat to produce an electric current which decomposes water to provide hydrogen which is used as fuel for the engine.

BACKGROUND OF THE INVENTION

At the present time, the public is confronted with two basic problems related to the consumption of fuel in an internal combustion engine. One of these problems is the pollution of the ambient atmosphere by the products of combustion. These noxious products are oxides of nitrogen ($NO_x$), carbon monoxide (CO) and unburned hydrocarbons (HC). Of late, considerable attention has been devoted in attempt to minimize if not completely obviate these noxious products of combustion.

The other problem deals with the conservation of fuel. The country is now faced with an energy shortage and much effort has been directed to the broad object of regenerating fuel from the heat of the engine, with the regenerated fuel being passed back to the engine for consumption therein.

It is now a well recognized phenomenum that when hydrogen is used as a fuel in an internal combustion engine the noxious products of combustion which pollute the atmosphere are reduced to a high degree if not completely eliminated. This has been found to be true not only when the hydrogen is the only fuel used, but also when the hydrogen is combined with conventional hydrocarbon fuels such as gasoline, diesel oil and the like.

The decomposition of water into its components of oxygen and hydrogen by passing an electric current therethrough is also a now well recognized phenomenum. Other methods of decomposing water to provide oxygen have also been proposed. One of these is to pass water or steam into contact with heated ferrous balls. Moreover, it has been proposed to use hydrogen so generated as a fuel in internal combustion engines. However, from the apparent lack of public acceptance of such technology, it is believed that this failure is due to the highly inefficient nature of such processes.

In the above identified applications and patent the oxygen from an electrolysis cell is either exhausted to ambient atmosphere or combined with air at the air intake of the engine. This is not the most efficient use of the oxygen which is possible. Also, there is some loss of heat in the working fluid circulatory system after the gases pass through the turbine and before these gases are delivered to a condenser.

The present invention is founded on the basic concept of utilizing heat derived from an internal combustion engine to generate electric power which decomposes water to provide hydrogen which is used in the engine. Thus, air pollution is reduced or avoided to a large extent and energy is conserved.

OBJECTS OF THE INVENTION

With the foregoing conditions in mind, the present invention has in view the following objectives:

1. To provide an internal combustion engine including means for deriving heat from the engine, utilizing this heat to generate an electric current, decomposing water by passing the electric current therethrough to provide hydrogen, and then using the hydrogen as a fuel in the engine.

2. To provide, in an internal combustion engine of the type noted, a circulatory system for a working fluid in the form of water and gas therefrom and which includes means for heating the working fluid either from the engine cooling system and/or the engine exhaust.

3. To provide, in an internal combustion engine of the character aforesaid, a turbine which is driven by the working fluid as it is expanded into gases. This turbine generator system may be of the type commonly known as a Rankine Cycle.

4. To provide, in an internal combustion engine of the kind described, a generator which is driven by the turbine and which generates a DC current which is conducted to an electrolysis cell.

5. To provide, in conjunction with an internal combustion engine of the type noted, a water supply tank from which water is passed to the electrolysis cell.

6. To provide, in conjunction with an internal combustion engine of the character aforesaid, a hydrogen tank into which hydrogen is introduced from the electrolysis cell under pressure.

7. To provide, in an internal combustion engine of the type described, a conduit which conducts hydrogen under pressure from the electrolysis cell and/or the hydrogen tank to a hydrogen carburetor.

8. To provide, in an internal combustion engine of the type noted, a conduit for passing oxygen under pressure from the electrolysis cell to the combustion chambers of the engine.

9. To provide, in an internal combustion engine of the character aforesaid, a fuel pump for conducting hybrocarbon fuel from a fuel tank to a carburetor, a pump for the working fluid system, and a pump for delivering water from the water tank and through the working fluid system to the electrolysis cell.

10. To provide, in an internal combustion engine of the kind described, an AC current generator which is part of the Rankine Cycle engine together with a power conditioner including a rectifier, a transformer and a voltage regulator for converting the AC current to DC current of a required voltage which is delivered to the electolysis cell.

11. To provide, in an internal combustion engine of the type noted, a battery which is charged by DC current from the rectifier.

12. To provide, in an internal combustion engine of the character aforesaid, a second generator which is powered by the momentum of a vehicle in which the engine is installed being slowed by braking and which delivers AC current to the power conditioner.

Various other more detailed objects and advantages of the invention, such as arise in connection with carrying out the above ideas in a practical embodiment will, in part, become apparent and, in part, be hereafter stated as the description of the invention proceeds.

SUMMARY OF THE INVENTION

The foregoing objects are achieved by providing an internal combustion engine which includes a cooling system, a fuel intake manifold and an exhaust manifold having an exhaust pipe extending therefrom, with a circulatory system which derives heat from the cooling system and the exhaust pipe for a working fluid which is water. A turbine in a Rankine Cycle is included in the working fluid system and is operated by the gases derived from heating the working fluid. The working fluid system is closed and also include a condenser for converting the gaseous working fluid back to its liquid form and a pump for circulating the working fluid. A heat exchanger is associated with the working fluid system immediately in advance of the condenser to derive heat from the gases after they have passed through the turbine.

The pump which circulates the water draws water from a water supply tank and a portion of this water is drawn from and delivered to an electrolysis cell. An AC generator is driven by the turbine and the AC current therefrom is conditioned by a power conditioner which delivers DC current to the electrolysis cell and battery. A second generator delivers AC current to the condition and is driven by the momentum of the vehicle on which it is installed and is slowed down as by braking.

Mounted on top of the engine in accordance with conventional practice is an air filter, and immediately below this air filter are two carburetors which communicate with the intake manifold of the engine. One of these carburetors is for conventional hydrocarbon fuel and the other is for hydrogen. The hydrocarbon fuel is conducted from a supply tank therefor to the carburetor for hydrocarbon fuel through a conduit including a pump. Another conduit extends from the other carburetor which is for hydrogen to that portion of the electrolysis cell in which hydrogen is collected. The hydrogen is under high pressure created by two sources. One of these is the heat of the circulating system and electrolysis and the other is the pump which circulates the water. A portion of the hydrogen is conducted to a tank and the remainder is passed through a conduit to a hydrogen carburetor. A valve is included in the conduit and is operable to determine when hydrogen is to be delivered to the hydrogen carburetor.

Oxygen under pressure is injected into the combustion chambers of the engine where it is mixed with combustive fuel from the manifold.

Now known internal combustion engines may be catalogued into three types. One is the conventional Otto cycle internal combustion engine now widely used in which the fuel is ignited by spark plugs. The second is the well known diesel cycle engine in which the fuel is ignited by compression of the intaken air gases. The third is the Brayton cycle turbine type internal combustion engine in which the fuel is burned at constant pressure to drive a turbine rather than a piston. The present invention is susceptible of embodiment in the internal combustion engines of each of the above noted types. The invention as applied to the first type is summarized in the preceding paragraphs. The apparatus required for a diesel engine is substantially the same, with the notable exception that the carburetor for the hydrocarbon fuel and the fuel intake manifold are replaced by fuel injectors. In the case of the turbine engine, the working fluid circulatory system, turbine included therein, generator, electrolysis cell, fuel supply tank, water supply tank, hydrogen tank and pumps therefor are the same as described in the preceding paragraphs. The difference between this embodiment of the invention and the others resides in the construction of the turbine engine.

For a full and more complete understanding of the invention, reference may be had to the following description and the accompanying drawings, wherein.

FIRST EMBODIMENT

Figure 1:
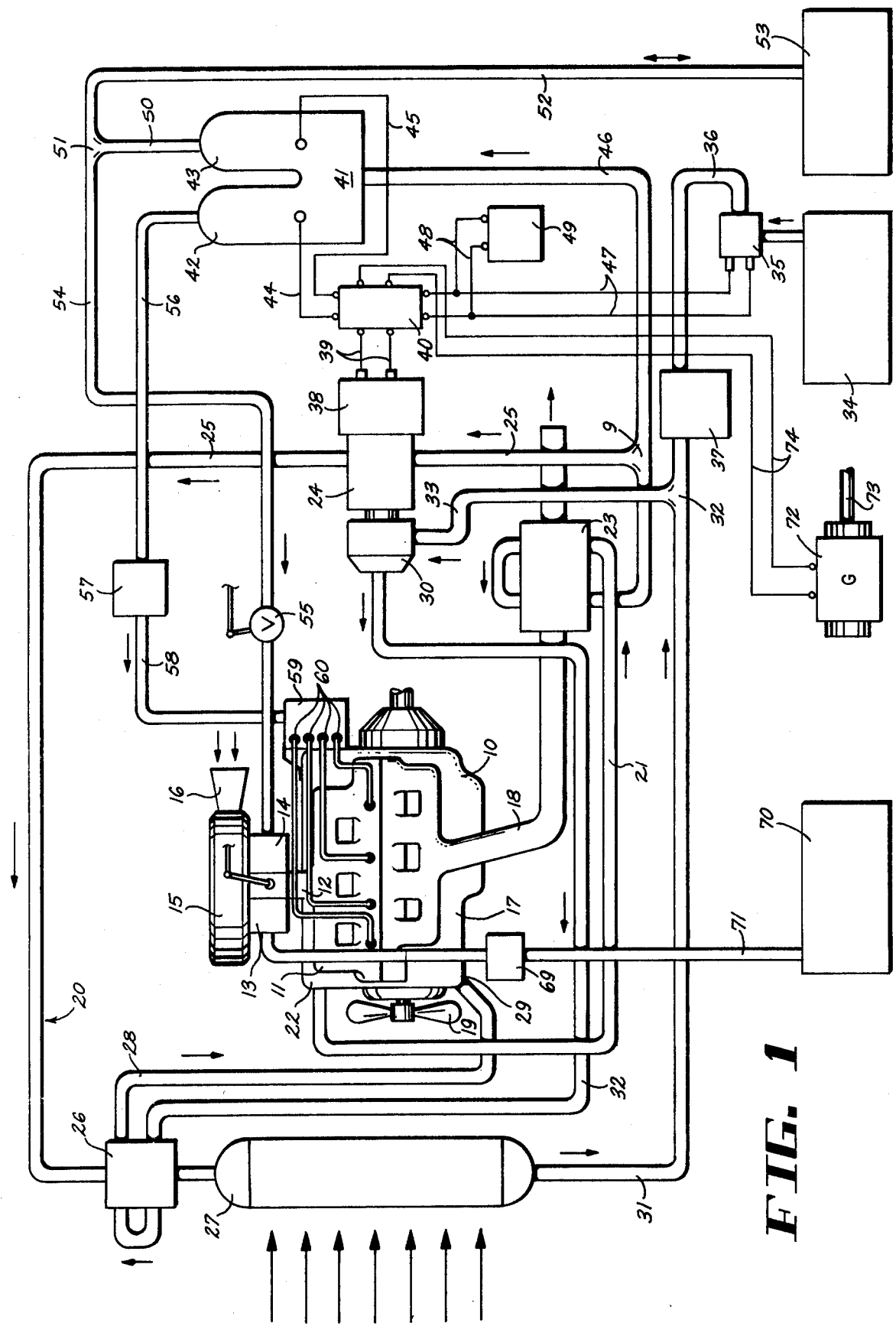
FIG. 1 is a diagrammatic view illustrating the essential elements of the present invention as applied to a conventional internal combustion engine of the piston type in which the fuel is ignited by spark plugs.

Referring now to the drawings wherein like reference characters denote corresponding elements throughout the several views, and first more particularly to FIG. 1, an internal combustion engine of the Otto or piston type in which the fuel is ignited by spark plugs is shown as including an engine block represented at 10. Mounted on engine block 10 is a fuel intake manifold 11 having a main stem 12 on which is mounted a carburetor or injector 13 for hydrocarbon fuel such as gasoline, and a hydrogen carburetor or injector 14. Both of the carburetors 13 and 14 communicate with stem 12. Mounted above carburetors 13 and 14 is an air filter 15 having an air intake 16.

Carried by engine block 10 is an exhaust manifold 17 from which extends an exhaust pipe 18. Engine block 10 includes a cooling system in accordance with accepted practice and hence, is not herein illustrated. However, a fan which may be considered as a part of the cooling system is indicated at 19.

A closed circulatory system as in a Rankine Cycle having working fluid such as water and gas derived therefrom is designated generally at 20. It comprises a conduit 21 which is in heat conducted relation to the cooling system of the engine to the point indicated at 22. It extends to and passes through to a heat exchanger 23 which is disposed about an exhaust pipe. From heat exchanger 23 conduit 21 extends to a junction 9 from which a tube 25 extends to a turbine 24.

The heat exchanger 23 converts the water into a gaseous state which drives the turbine. After leaving the turbine, these gases pass through a conduit 25, through a second heat exchanger 26 and to a condenser 27.

A pipe 28 passes through heat exchanger 26 and is connected to the engine cooling system at 29. The other leg of the pipe 28 communicates with a pump 30 which is driven by turbine 24.

Connected to the lower end of condenser 27 is another pipe 31 which extends to a junction 32 and from the latter a tube 33 extends to pump 30.

A water supply tank is designated at 34 and water is drawn therefrom by pump 35 through a tube 36 to junction point 32 with a water purifier 37 being included in tube 36.

At this point it is well to note that water from the condenser and purified water from the supply tank 34 intermix at junction point 32 and the combined waters are circulated by pumps 30 and 35.

Turbine 24 drives an AC generator 38 that is connected by lines 39 to a power conditioner 40 which includes a rectifier, a transformer and a voltage regulator to convert the AC current to DC current of a required voltage. An electrolysis cell 41 incldes a leg 42 in which oxygen is collected and a leg 43 for hydrogen. Electrolysis cell 41 is connected to conditioner 40 by lines 44 and 45. Water under pressure is delivered to cell 41 by a pipe 46 which extends from junction 9 to cell 41. It is evident that the water is decomposed in the cell and the oxygen and hydrogen gases collected in the respective legs 42 and 43 are under a high pressure due to the heat and the action of pump 30.

From conditioner 40 lines 47 extend to a motor (not illustrated) which drives pump 35. Lines 48 are takken off of lines 47 and charge a battery 49.

A conduit 50 extends from the upper end of hydrogen leg 43 to a junction 51. From the latter a pipe 52 goes to a hydrogen storage tank 53. From the other side of junction 51 a tube 54 which includes a valve 55 goes to hydrogen carburetor 14. From oxygen leg 42 a conduit 56 extends to an oxygen tank 57 and from the latter, another conduit 58 goes to an oxygen distributor 59 that is mounted on engine block 10. From distributor 59 tubes 60 extend to intake manifold 11. A tank for hydrocarbon fuel such as gasoline is shown at 70 and from it a conduit 71 extends to carburetor 13 for hydrocarbon fuel with a pump 69 being included at conduit 71.

Generator 72 is mounted at an appropriate point on the vehicle on which the engine is installed and includes a drive shaft 73 which is driven by one of the driving or traction elements of the vehicle under the momentum derived from the slowing down of the vehicle as by braking. AC current from the generator 72 is conducted by lines 74 to rectifier 40.

OPERATION—FIRST EMBODIMENT

It is believed that the description of the various elements of FIG. 1 set forth renders it unnecessary to herein set forth a detailed description thereof. However, it is noted that the water which goes to electrolysis cell 41 is purified. Moreover, this water is heated from three sources, one of these is the cooling system of the engine and the other two are the heat exchangers 23 and 26. As the water is heated electrolysis cell 41 is also heated and the pressure of the gases therein is increased by this heat and is also under the pressure of pump 30 which is slightly enhanced by pump 35. Thus, the hydrogen is injected under pressure into the hydrogen carburetor and the oxygen is also injected under pressure to the fuel intake manifold.

Figure 6:
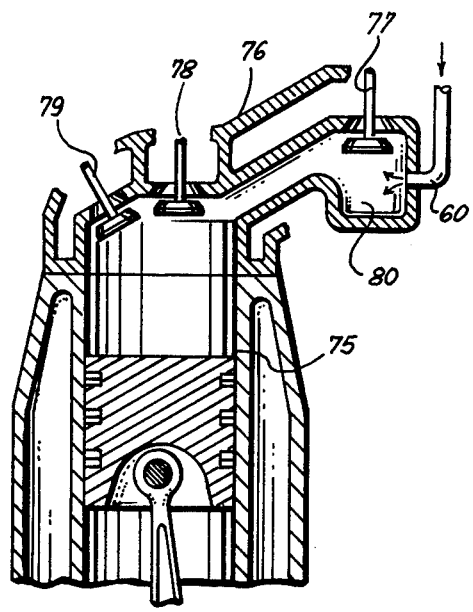
FIG. 6 is a similar section through a portion of a cylinder and piston of an Otto engine.

Upon reference to FIG. 6, the advantage to be gained by injecting the oxygen under pressure becomes apparent. The cylinder of an internal combustion engine of the Otto type is shown at 75. It includes a head 76 in which are mounted fuel intake valves 77 and 78 and an exhaust valve 79. Head 76 includes a chamber 80 immediately below valve 77 and into which a tube 60 opens. This arrangement provides what is known in the art as a stratified combustion of the fuel. Thus, the oxygen is first mixed with the rich fuel and then with the leaner fuel mixtures.

SECOND EMBODIMENT

Figure 2:
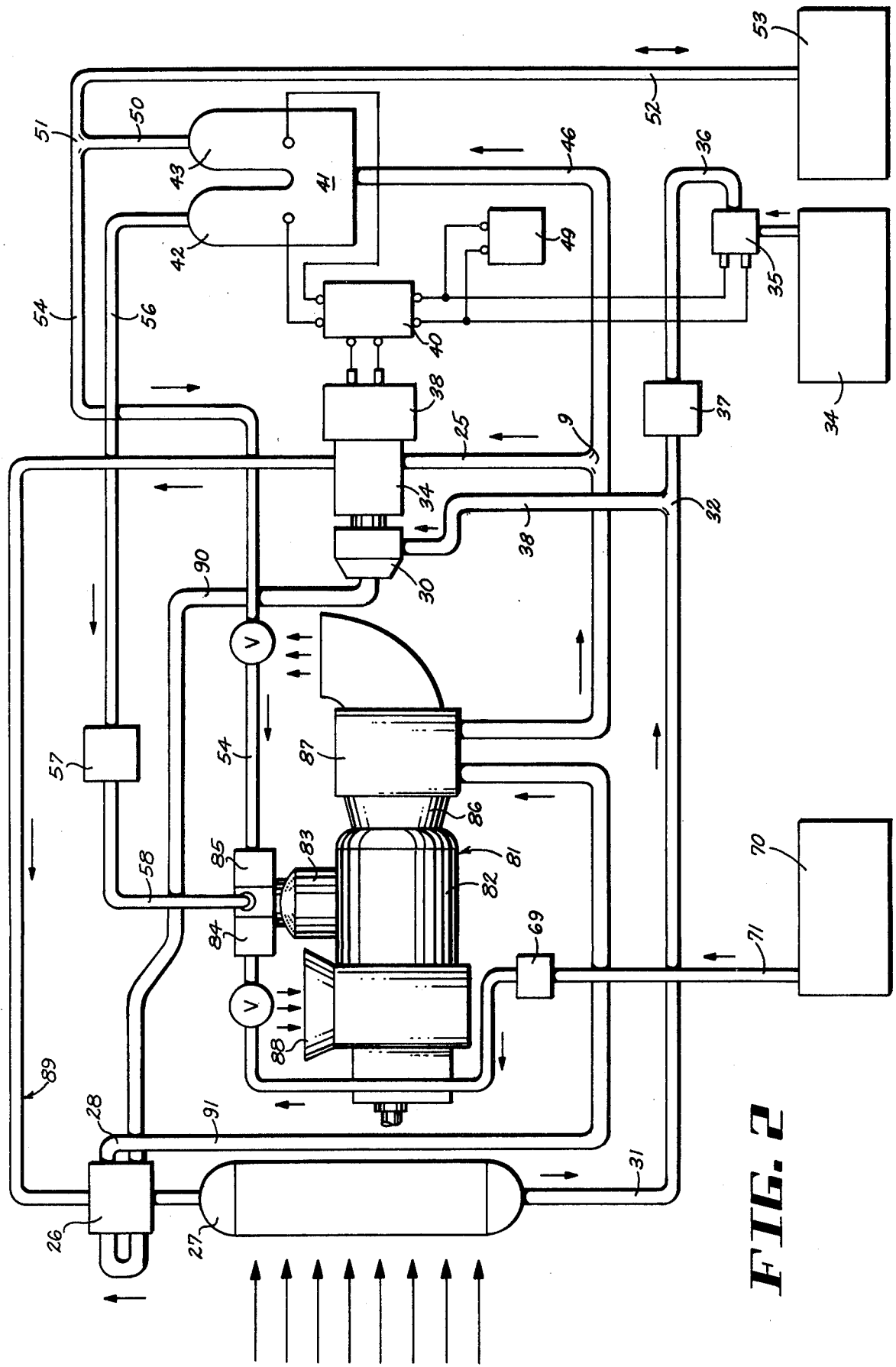
FIG. 2 is a diagrammatic view depicting the invention as applied to a turbine engine.

This embodiment diagrammatically illustrates the incorporation of the present invention into an internal combustion engine of the turbine type as illustrated in FIG. 2. The turbine engine is represented at 81. It includes a casing 82 providing a combustion chamber into which fuel is introduced through an intake 83. A metering control 84 for hydrocarbon fuel is mounted over intake 83 as is a metering control 85 for hydrogen. An exhaust pipe 86 extends from casing 82 and disposed thereabout is a heat exchanger 87, which corresponds to the heat exchanger 23 of FIG. 1. An air intake for engine 81 is represented at 88. The remaining elements illustrated in FIG. 2, with some exceptions, are the same as the corresponding elements of FIG. 1, and have been so designated by like reference characters.

The working fluid system is somewhat different from that of FIG. 1 and is designated at 89. It comprises a conduit 90 which extends from pump 30 and passes through heat exchanger 26 from which it emerges as conduit 91 which passes around exhaust pipe 86 in heat exchanger 87. From the latter it extends to junction 9 from which tube 25 goes to turbine 24 and conduit 46 to cell 41.

The main difference between the apparatus of FIG. 1 and that of FIG. 2 is that in the water circulating system of FIG. 2, heat is derived from heat exchangers 26 and 87 alone and not from the cooling system of the engine. Also, conduit 58 from oxygen tank 57 discharges into fuel intake 83.

The operation of the turbine is substantially the same as that described above in connection with FIG. 1 with the notable exception that the fuel pump indicated at 72 includes a fuel metering control governing the rate at which fuel is delivered from fuel tank 70 to the fuel metering control 84. Also, hydrogen gas is delivered by conduit 54 to fuel metering control 85.

THIRD EMBODIMENT

Figure 3:
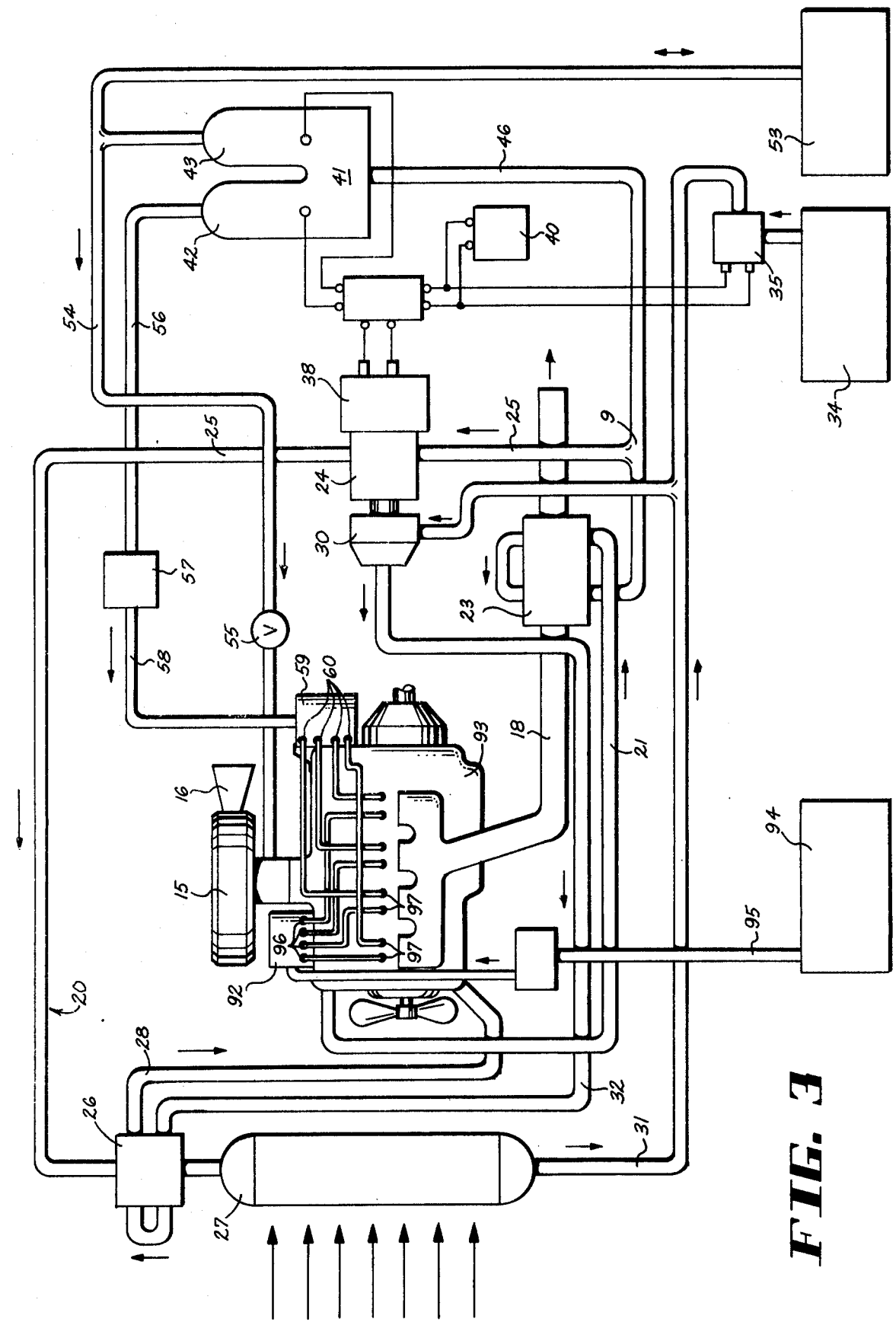
FIG. 3 is another diagrammatic view of the invention as incorporated into a diesel engine.

This is illustrated in FIG. 3 and shows the invention as applied to a diesel engine. The difference between the diesel engine of FIG. 3 and the conventional Otto engine of FIG. 1 resides in the elimination of intake manifold 11 and carburetor 13 which are replaced by fuel injectors. Thus, manifold 92 is mounted on the engine block 93 and receives diesel fuel from fuel injector pump and distribution supply tank 94 through tube 95. Distribution tubes 96 extend from manifold 92 to injection ports 97 in engine block 93. Just as in FIG. 1 conduit 58 delivers oxygen under pressure to a distributor 59. From the latter, tubes 60 extend to the combustion chambers of the diesel engine.

Figure 5:
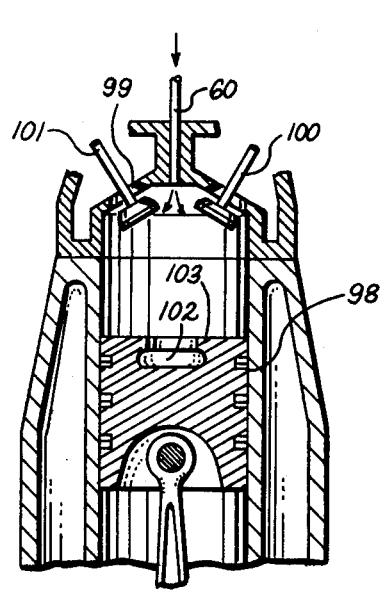
FIG. 5 is a section through a portion of a cylinder of a diesel engine and a piston therein.

Just as in FIG. 1 the injection of oxygen under pressure provides for a stratified mixture of the oxygen with the carbureted fuel, a cylinder of a diesel engine is shown in FIG. 5 at 98 and includes a head 99 in which are mounted valves 100 and 101. Tubes 60 enter the head centrally thereof and from which oxygen is injected into chamber 102 formed in piston 103.

FOURTH EMBODIMENT

Figure 4:
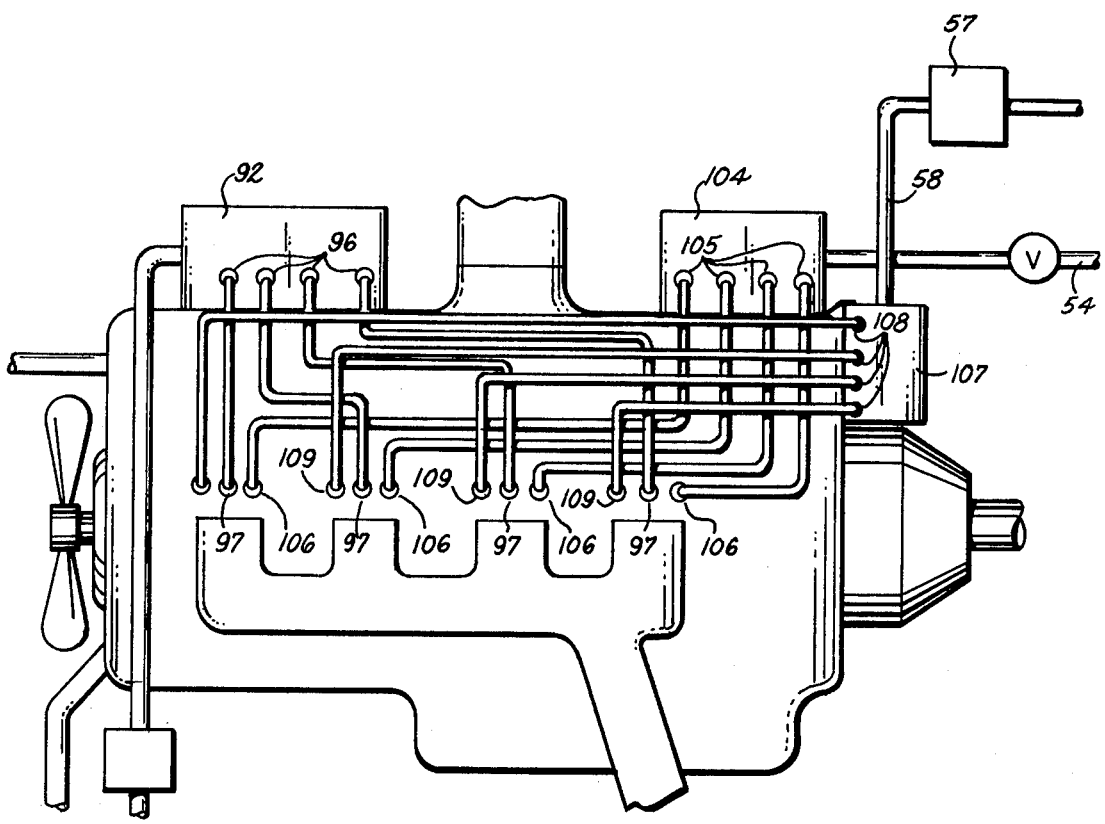
FIG. 4 is a schematic view of a modification of the diesel engine embodiment.

Referring more particularly to FIG. 4, a modification of the diesel engine embodiment is therein illustrated in which hydrogen gas is delivered directly to the injection ports in the engine block rather than to the air intake. Conduit 54 is connected to a hydrogen fuel injector pump and distribution manifold 104 from which extend four distribution tubes 105 which are connected at their other ends to injection ports 106.

Just as in FIG. 3 diesel fuel distributor 92 is mounted on block 93 and tubes 96 extend therefrom to injection ports 97.

Oxygen distributor 107 receives oxygen under pressure from tank 57 through tube 58. From distributor 107 four tubes 108 extend to injection ports 109. The same stratified mixture action takes place as described above in FIG. 5.

While preferred specific embodiments are herein disclosed. it is to be clearly understood that the invention is not to be limited to the exact constructions, mechanisms and devices illustrated and described because various modifications of these details may be provided in putting the invention into practice.

What is claimed is:

1. In an internal combustion engine;
   (a) an engine block providing at least one combustion chamber;
   (b) an exhaust pipe extending from said block;
   (c) a partially closed system for a working fluid in the form of water and gas emanating therefrom by heating of the water and including a pump for circulating the working fluid through the system, a turbine which is operated by the working fluid in a gaseous state, and a condenser for returning the working fluid from a gaseous state to water;
   (d) a heat exchanger disposed about said exhaust pipe and through which said working fluid system passes to derive heat from said exhaust pipe and heat the working fluid;
   (e) a generator driven by said turbine to produce an electric current;
   (f) an electrolysis cell containing water and connected to said generator whereby current from said generator decomposes the water into oxygen and hydrogen;
   (g) a water tank connected to said working fluid system by a conduit including a water purifier, and a piper for taking purified water from said system and delivering it to said electrolysis cell;
   (h) a hydrogen carburetor on said engine block for delivering hydrogen to a combustion chamber in said block;
   (i) a conduit extending from said electrolysis cell to said hydrogen carburetor and which conveys hydrogen from said cell and delivers it to said hydrogen carburetor under pressure by the heat of said cell and the pump which circulates the working fluid;
   (j) a fuel tank for a hydrocarbon fuel;
   (k) a hydrocarbon fuel carburetor on said engine block and connected to said hydrocarbon fuel tank; and
   (l) means for conveying oxygen from said electrolysis cell and delivering it under pressure to said combustion chamber by pressure generated by said cell and the pump which circulates the working fluid.

2. The internal combustion engine of claim 1 in which there is a second heat generator closely adjacent to said condenser and through which that portion of the working fluid system in which the working fluid in a gaseous state passes.

3. The internal combustion engine of claim 1 in which the engine includes a cooling system and the working fluid system is associated therewith to derive heat therefrom.

4. The internal combustion engine of claim 1 in which the generator generates AC current together with a power conditioner including a rectifier, a transformer and a voltage regulator for converting said AC current to DC current of a required voltage which is delivered to said electrolysis cell.

5. The internal combustion engine of claim 4 in which water is drawn from said water tank through said conduit connected to said working fluid system by a motor driven pump included in said last mentioned conduit; and electric lines between said motor and said power conditioner.

6. The internal combustion engine of claim 4 together with a second generator for AC current which is connected to said power conditioner and having a drive shaft operatively connected to the traction driving mechanism of the vehicle in which the engine is installed and rendered effective by the momentum of the vehicle as it is being slowed.

7. The internal combustion engine of claim 4 together with a battery which is connected to said rectifier.

8. The internal combustion engine of claim 1 in which the engine is of the Otto type and includes a plurality of combustion chambers.

9. In an internal combustion engine:
   (a) an engine block providing at least one combustion chamber;
   (b) an exhaust pipe extending from said block;
   (c) a partially closed system for a working fluid in the form of water and gas emanating thereform by heating of the water and including a pump for circulating the working fluid through the system, a turbine which is operated by the working fluid in gaseous state, and a condenser for returning the working fluid from a gaseous state to water;
   (d) a heat exchanger disposed about said exhaust pipe and through which said working fluid system passes to derive heat from said exhaust pipe and heat the working fluid;
   (e) a generator driven by said turbine to produce an electric current;
   (f) an electrolysis cell containing water and connected to said generator whereby current from said generator decomposes the water into oxygen and hydrogen;
   (g) a water tank connected to said working fluid system by a conduit including a water purifier, and a pipe for taking purified water from said system and delivering it to said electrolysis cell;
   (h) means for conveying hydrogen from said electrolysis cell and delivering it under pressure to a combustion chamber in said block by pressure generated by said cell and the pump which circulates the working fluid;
   (i) a fuel tank for a hydrocarbon fuel;
   (j) means for delivering said hydrocarbon from said fuel tank to said combustion chamber; and
   (k) means for conveying oxygen from said electrolysis cell and delivering it under pressure to said combustion chamber by pressure generated by said cell and the pump which circulated the working fluid.

10. The internal combustion engine of claim 9 in which the engine is of the turbine type and includes a combustion chamber.

11. The internal combustion engine of claim 9 in which the engine is a diesel engine including a plurality of combustion chambers and the hydrogen, hydrocarbon fuel, and oxygen are all injected under pressure into the combustion chambers.

* * * * *